US008502502B2

(12) United States Patent
Huang et al.

(10) Patent No.: US 8,502,502 B2
(45) Date of Patent: Aug. 6, 2013

(54) ELECTRICITY STORING DEVICE AND ELECTRONIC DEVICE

(75) Inventors: Shyh-Ching Huang, Taipei Hsien (TW); Yu-You Ting, Taipei Hsien (TW); Chien-Hsun Wang, Taipei Hsien (TW)

(73) Assignee: Wistron Corporation, New Taipei (TW)

( * ) Notice: Subject to any disclaimer, the term of this patent is extended or adjusted under 35 U.S.C. 154(b) by 168 days.

(21) Appl. No.: 12/905,092

(22) Filed: Oct. 15, 2010

(65) Prior Publication Data
US 2011/0305933 A1  Dec. 15, 2011

(30) Foreign Application Priority Data
Jun. 10, 2010 (TW) ................................. 99118890 A

(51) Int. Cl.
*H02J 7/00* (2006.01)
*H02J 7/14* (2006.01)
*H01M 2/10* (2006.01)

(52) U.S. Cl.
USPC ........... 320/116; 320/117; 320/120; 320/121; 320/123; 429/97

(58) Field of Classification Search
USPC ............................. 320/116, 117, 120, 121, 123
See application file for complete search history.

(56) References Cited

U.S. PATENT DOCUMENTS

| | | | | |
|---|---|---|---|---|
| 4,274,043 A * | 6/1981 | Heitz | ............................ | 320/117 |
| 6,586,910 B2 * | 7/2003 | Matsui et al. | ................. | 320/122 |
| 7,782,013 B2 * | 8/2010 | Chang | ............................ | 320/116 |
| 7,898,223 B2 * | 3/2011 | Takeda et al. | ................. | 320/166 |
| 7,962,212 B2 * | 6/2011 | Signoff et al. | ................... | 607/34 |
| 8,129,952 B2 * | 3/2012 | Lee | ................................ | 320/140 |
| 8,199,449 B2 * | 6/2012 | Kuschnarew et al. | .......... | 361/88 |
| 2007/0108944 A1 * | 5/2007 | Pellenc | ........................ | 320/130 |
| 2011/0001442 A1 * | 1/2011 | Lee et al. | ...................... | 318/139 |

FOREIGN PATENT DOCUMENTS

| | | |
|---|---|---|
| CN | 2634707 Y | 8/2004 |
| CN | 1797893 A | 7/2006 |
| CN | 2888720 Y | 4/2007 |
| CN | 201160230 Y | 12/2008 |

OTHER PUBLICATIONS

Office action mailed on Dec. 19, 2012 for China application No. 201010203026.8, p. 3 line 3-31, p. 4-6 and p. 7 line 1-23.
Office action mailed on Mar. 27, 2013 for the Taiwan application No. 099118890, filed: Jun. 10, 2010, p. 2~5 and p. 6 line 1~6.

* cited by examiner

*Primary Examiner* — M'Baye Diao
(74) *Attorney, Agent, or Firm* — Winston Hsu; Scott Margo

(57) ABSTRACT

An electricity storing device includes a high-voltage terminal, a low-voltage terminal, a plurality of rechargeable battery modules, a plurality of first switches each coupled between one rechargeable battery module and the high-voltage terminal, a plurality of second switches each coupled between one rechargeable battery module and the low-voltage terminal, a plurality of third switches each coupled between two of the rechargeable battery modules, and a control module for outputting a control command to control couplings of the plurality of first switches, the plurality of second switches and the plurality of third switches.

12 Claims, 9 Drawing Sheets

ELECTRICITY STORING DEVICE AND ELECTRONIC DEVICE

BACKGROUND OF THE INVENTION

1. Field of the Invention

The present invention relates to an electricity storing device and electronic device, and more particularly, to an electricity storing device and electronic device capable of operating with excellent flexibility and meeting all kinds of power requirements.

2. Description of the Prior Art

A rechargeable battery is an energy storing device capable of performing charging and discharging operations repeatedly, and has been widely used in electronic devices or equipments requiring independent power, such as mobile phones, personal digital assistants (PDAs), electronic books, portable computers, electric cars, etc. Since all kinds of electronic devices or equipments may require different power, in order to reduce complexity of manufacturing processes, related manufacturers usually manufacture rechargeable battery cells conforming to a specific power specification, and then connect at least one rechargeable battery cells in series or in parallel to compose rechargeable batteries conforming to required specifications.

For example, please refer to FIG. 1, which is a schematic diagram of a conventional rechargeable battery 10. The rechargeable battery 10 includes a housing 100 and battery units 102, 104, 106, and can output power conforming to a specific specification, or receive power to perform energy storing operations via terminals 108, 110. The battery units 102, 104, 106 are energy storing devices of same specification, and is connected in series and packaged in the housing 100. In other words, if each fully-charged battery unit can generate power of 1V, the rechargeable battery 10 can output power of 3V via the terminals 108, 110.

Therefore, as long as an appropriate amount of battery units are assembled, i.e. connected in series or in parallel, the manufacturer can provide rechargeable batteries conforming to different specifications merely by manufacturing battery units of the same specification, so as to enhance manufacturing efficiency. However, the conventional rechargeable battery 10 has at least following two shortcomings.

First, in order to ensure stability and safety of products, the battery units 102, 104, 106 are irreversibly packaged in the housing 100, and the battery units 102, 104, 106 are usually immovable connected, e.g. soldering. In other words, users cannot easily remove the battery units 102, 104, 106. Even if the battery units 102, 104, 106 are removed by a special method, e.g. desoldering, the rechargeable battery 10 can not be easily recovered to an initial state. In such a situation, for an ordinary user, once one of the battery units 102, 104, 106 fails, the rechargeable battery 10 fails as well, and can not function as expected.

Second, in order to ensure safety of charging and discharging operations, protecting circuits (not shown in FIG. 1) need to be installed between the battery units 102 and 104 and between the battery units 104 and 106. Operating principles of the battery units 102, 104, 106 are reversible converting processes between electrical energy and chemical energy. If the converting processes are not properly controlled, the rechargeable battery 10 may be damaged, or even worse, cause explosion. Therefore, in order to ensure safety, protecting circuits need to be installed at least between the battery units 102 and 104 and between the battery units 104 and 106, which increases manufacturing cost. Besides, safety concerns are still arisen when the protecting circuits fail.

As can be seen from the above, the battery units of the conventional rechargeable battery can not be flexibly replaced, which does not meet a trend of resource saving, and can not effectively reduce manufacturing cost and safety concerns. Thus, there is a need for improvement.

SUMMARY OF THE INVENTION

It is therefore an objective of the present invention to provide an electricity storing device and electronic device.

The present invention discloses an electricity storing device. The electricity storing device includes a high-voltage terminal, a low-voltage terminal, a plurality of rechargeable battery modules, each for storing electrical energy or outputting stored electrical energy, a plurality of first switches, each coupled between one of the plurality of rechargeable battery modules and the high-voltage terminal, for turning on or turning off electrical connection between the rechargeable battery module and the high-voltage terminal according to a control command, a plurality of second switches, each coupled between one of the plurality of rechargeable battery modules and the low-voltage terminal, for turning on or turning off electrical connection between the rechargeable battery module and the low-voltage terminal according to the control command, a plurality of third switches, each coupled between two of the plurality of rechargeable battery modules, for turning on or turning off electrical connection between the two rechargeable battery modules according to the control command, and a control module, for outputting the control command to control the plurality of first switches, the plurality of second switches and the plurality of third switches.

The present invention further discloses an electronic device. The electronic device includes an operating circuit, for realizing functions of the electronic device, and an electricity storing device, for supplying electricity for the operating circuit. The electricity storing device includes a high-voltage terminal, a low-voltage terminal, a plurality of rechargeable battery modules, each for storing electrical energy or outputting stored electrical energy, a plurality of first switches, each coupled between one of the plurality of rechargeable battery modules and the high-voltage terminal, for turning on or turning off electrical connection between the rechargeable battery module and the high-voltage terminal according to a control command, a plurality of second switches, each coupled between one of the plurality of rechargeable battery modules and the low-voltage terminal, for turning on or turning off electrical connection between the rechargeable battery module and the low-voltage terminal according to the control command, a plurality of third switches, each coupled between two of the plurality of rechargeable battery modules, for turning on or turning off electrical connection between the two rechargeable battery modules according to the control command, and a control module, for outputting the control command to control the plurality of first switches, the plurality of second switches and the plurality of third switches.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
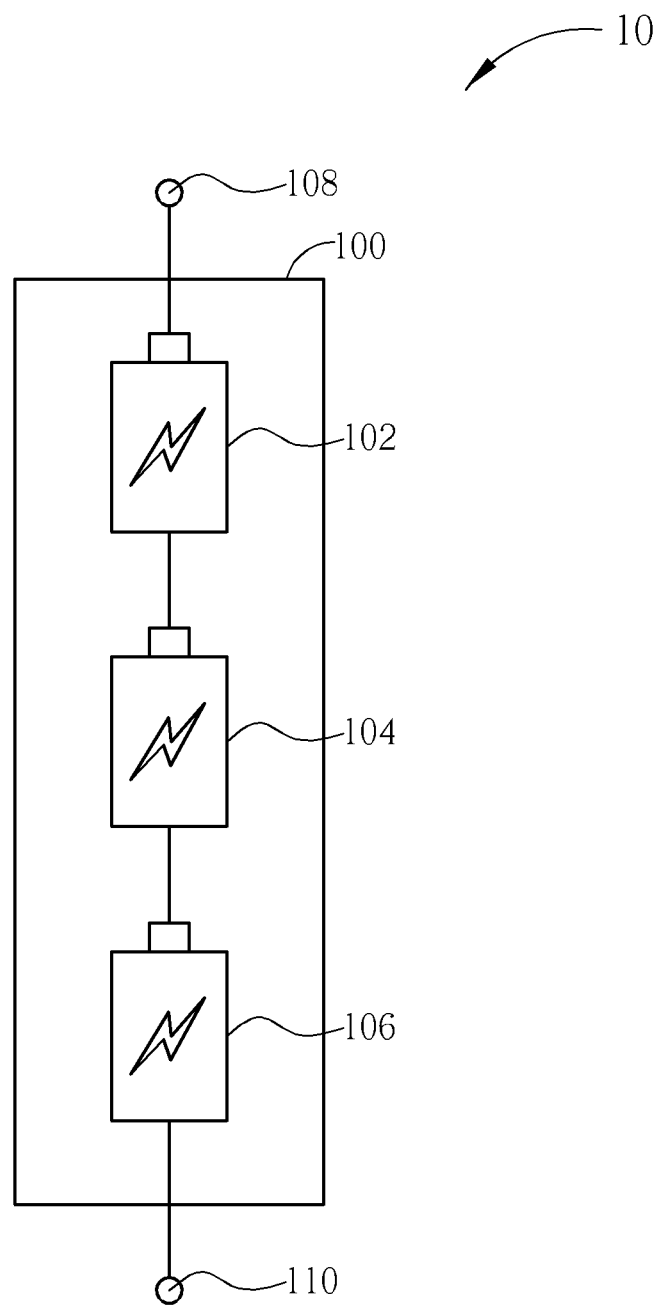
FIG. 1 is a schematic diagram of a conventional rechargeable battery.
Figure 2A:
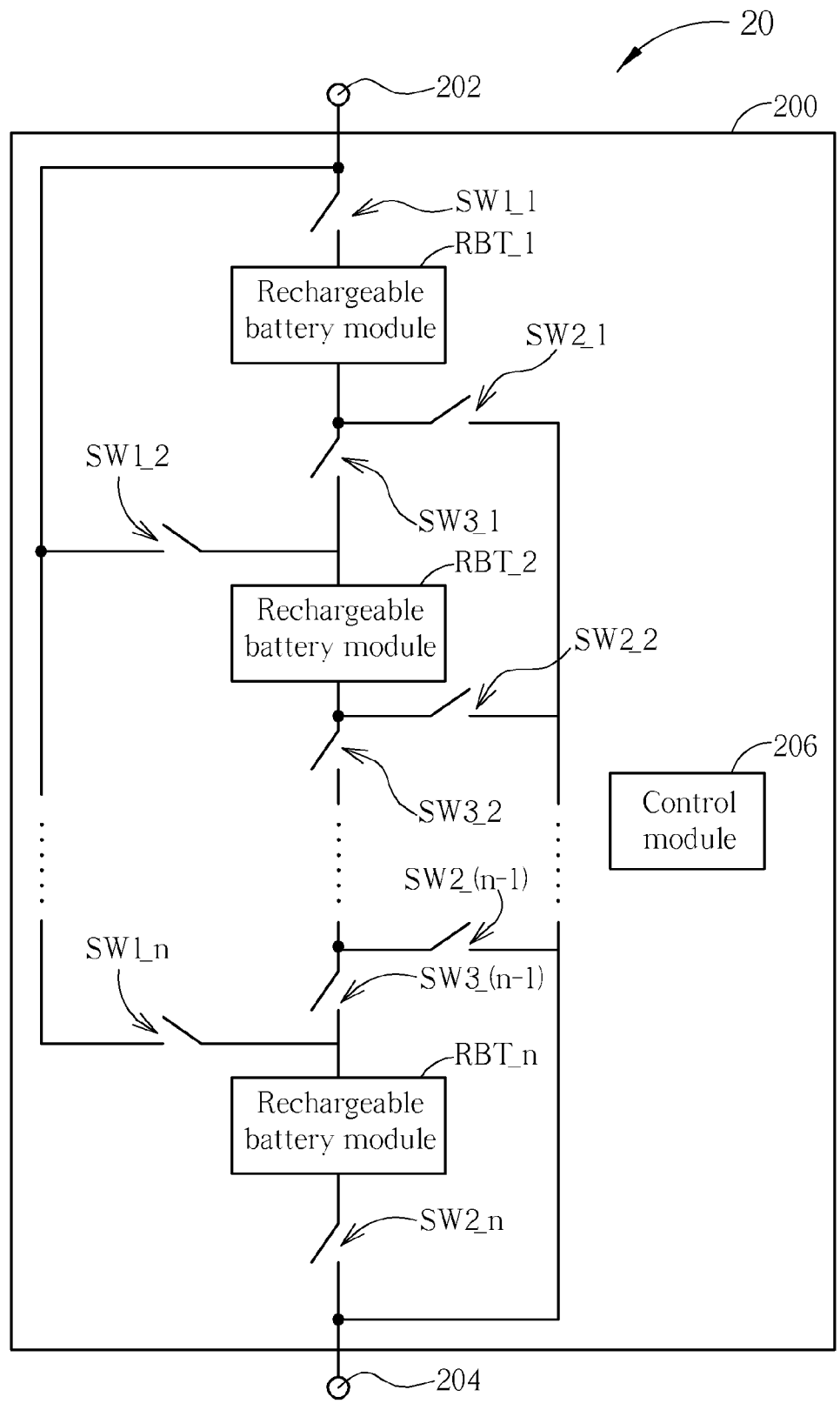
FIG. 2A is a schematic diagram of an electricity storing device according to an embodiment of the present invention.

Please refer to FIG. 2A, which is a schematic diagram of an electricity storing device 20 according to an embodiment of the present invention. The electricity storing device 20 can be used in an electronic device or equipment requiring independent power, such as mobile phones, personal digital assistants (PDAs), electronic books, portable computers, electric car, etc., and supplies electricity for operating circuits thereof. The electricity storing device 20 includes an assembly box 200, a high-voltage terminal 202, a low-voltage terminal 204, rechargeable battery modules RBT_1~RBT_n, first switches SW1_1~SW1_n, second switches SW2_1~SW2_n, third switches SW3_1~SW3_(n−1) and a control module 206. The assembly box 200 assembles all elements. The high-voltage terminal 202 and the low-voltage terminal 204 are coupled to a power generator to perform charging operations, or coupled to a load to perform discharging operations. All of the rechargeable battery modules RBT_1~RBT_n can perform reversible converting process between electrical energy and chemical energy, to store electrical energy or output stored electrical energy. The first switches SW1_1~SW1_n are coupled between positive electrodes of the rechargeable battery modules RBT_1~RBT_n and the high-voltage terminal 202, for switching electrical connection between a positive electrode of each rechargeable battery module and the high-voltage terminal 202 according to a control command generated by the control module 206. The second switches SW2_1~SW2_n are coupled between negative electrodes of the rechargeable battery modules RBT_1~RBT_n and the low-voltage terminal 204, for switching electrical connection between a negative electrode of each rechargeable battery module and the low-voltage terminal 204 according to the control command generated by the control module 206. The third switches SW3_1~SW3_(n−1) are coupled between any two rechargeable battery modules, for switching electrical connection between adjacent rechargeable battery modules according to the control command generated by the control module 206, e.g. the third switch SW3_1 is coupled between the rechargeable battery modules RBT_1 and RBT_2, for controlling electrical connection between the rechargeable battery modules RBT_1 and RBT_2. The control module 206 outputs the control command according to a required operation, such as charging, discharging, detecting etc., to control ON/OFF of the first switches SW1_1~SW1_n, the second switches SW2_1~SW2_n and the third switches SW3_1~SW3_(n−1).

Figure 2B:
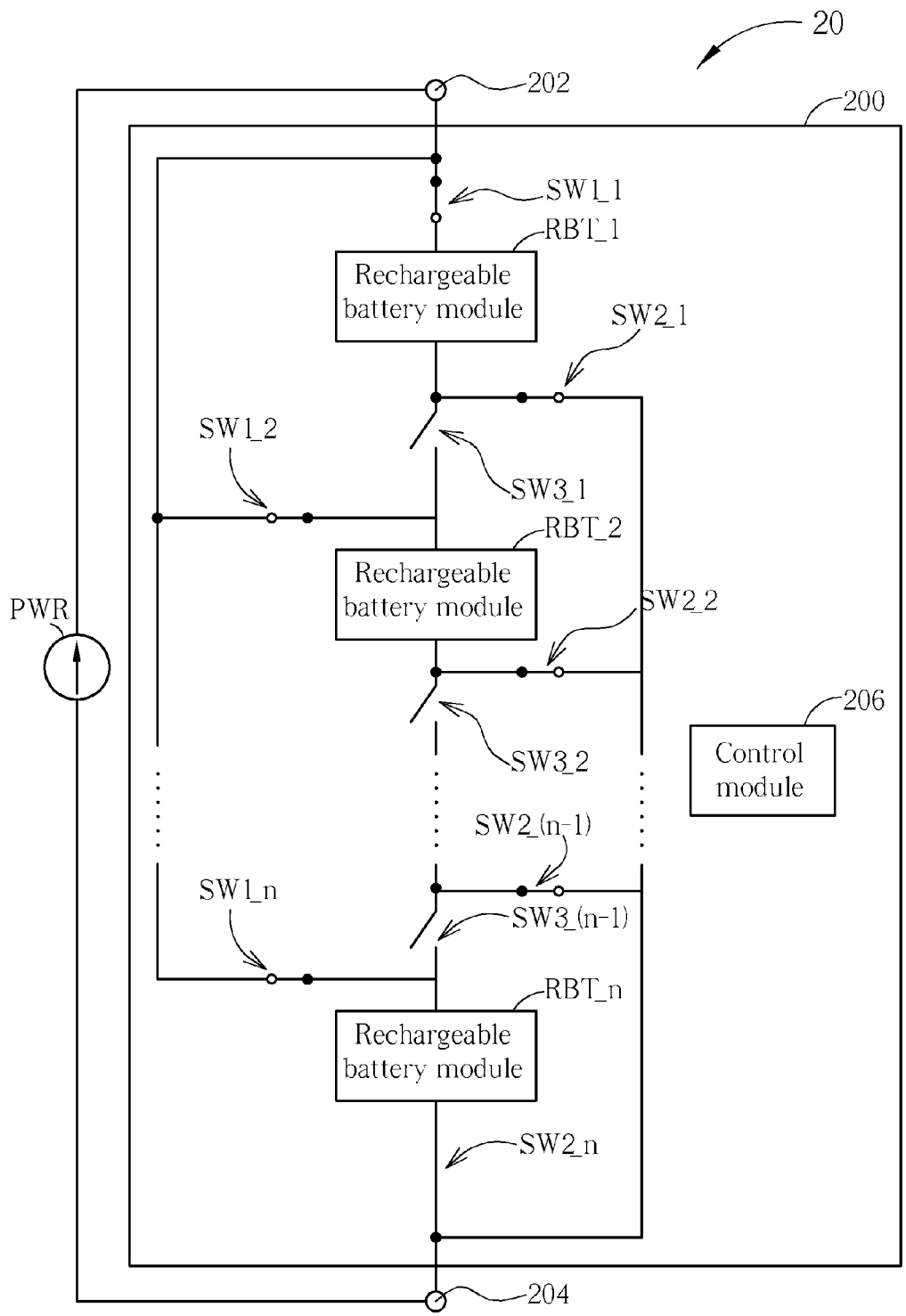
FIG. 2B is a schematic diagram of the electricity storing device of FIG. 2A performing charging operations.
Figure 2C:
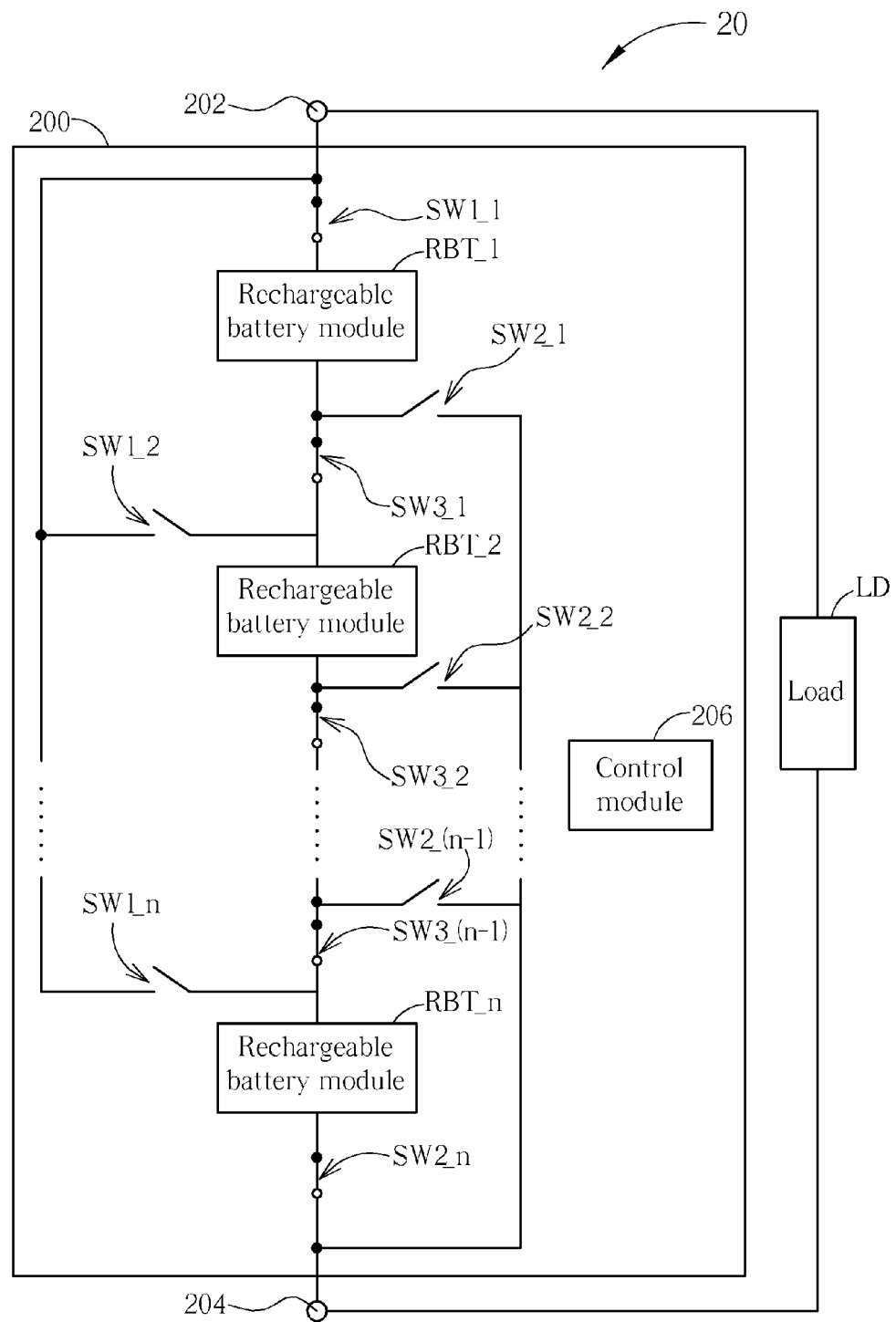
FIG. 2C is a schematic diagram of the electricity storing device of FIG. 2A performing discharging operations.

In short, the control module 206 controls the electrical connections between the rechargeable battery modules RBT_1~RBT_n and the high-voltage terminal 202, between the rechargeable battery modules RBT_1~RBT_n and the low-voltage terminal 204 or between any two of the rechargeable battery modules RBT_1~RBT_n, to achieve a specific operating purpose. In such a situation, the electricity storing device 20 can operate with excellent flexibly. For example, please refer to FIG. 2B and FIG. 2C. FIG. 2B is a schematic diagram of the electricity storing device 20 performing charging operations, and FIG. 2C is a schematic diagram of the electricity storing device 20 performing discharging operations. As shown in FIG. 2B, if the high-voltage terminal 202 and the low-voltage terminal 204 are coupled to a power generator PWR, the control module 206 turns on the first switches SW1_1~SW1_n and the second switches SW2_1~SW2_n, and turns off the third switches SW3_1~SW3_(n−1). In other words, the power generator PWR is connected in parallel with the rechargeable battery modules RBT_1~RBT_n to perform charging operations. Since there is no current flowing between the rechargeable battery modules RBT_1~RBT_n, the risk of one rechargeable battery module draining too much current and thus being burnt can be avoided. Moreover, voltages across each rechargeable battery module are the same when each is charged in parallel, to ensure charging efficiencies for each rechargeable battery module are at approximate levels.

Furthermore, for discharging operation, as shown in FIG. 2C, if the high-voltage terminal 202 and the low-voltage terminal 204 are coupled to a load LD, the control module 206 controls the first switch SW1_1, the second switch SW2_n and the third switches SW3_1~SW3_(n−1) to be turned on, and controls the first switches SW1_2~SW1_n and the second switches SW2_1~SW2_(n−1) to be turned off. In other words, the rechargeable battery modules RBT_1~RBT_n are connected in series to supply power to the load LD.

Therefore, as can be seen from FIG. 2B and FIG. 2C, the rechargeable battery modules RBT_1~RBT_n are connected in parallel to drain the power generated by the power generator PWR when performing charging operations, and the rechargeable battery modules RBT_1~RBT_n are connected in series to output power to the load LD when performing discharging operations. In such a situation, the present inventions can reduce safety concerns for charging operations, and enhance power outputting capability. Noticeably, FIG. 2B and FIG. 2C are only utilized for illustrating operating flexibility of the present invention. Practically, the electricity storing device 20 can realize multiple operating forms, which depends on system requirements, and are not limited to these.

In detail, assume that each of the rechargeable battery modules RBT_1~RBT_n conforms to a same power specification, and can individually supply power with voltage=V and current=I when being fully-charged. Therefore, if the embodiment of FIG. 2B is applied for discharging operations, i.e. the power generator PWR is replaced with the load LD of FIG. 2C or other electrical driven devices, the embodiment of FIG. 2B supplies power with voltage=V and current=n*I at most. In comparison, the exemplary embodiment of FIG. 2C can supply power with voltage=n*V and current=I. In other words, as long as an amount of rechargeable battery modules of the electricity storing device 20 connected in parallel or in series is properly adjusted, a required power specification can be met. Besides, an amount of rechargeable battery modules of the rechargeable battery modules RBT_1~RBT_n really outputting power should be adjusted according to the required power specification as well. Therefore, if a required power specification is 1V and 1 I, the control module 206 only needs to turn on electrical connections from one of the rechargeable battery modules RBT_1~RBT_n to the high-voltage terminal 202 and the low-voltage terminal 204, e.g. turning on the first switch SW1_1 and the second switch SW2_1, and turning off other switches.

Noticeably, connections between the control module 206 and each switch are omitted for simplicity in FIG. 2A to FIG. 2C. The control module 206 is preferably realized by a microprocessor, whose operating logic can be adjusted by programming, while other realization such as software, or hardware can be applied in the present invention as well, and not limited to this. Therefore, designer can properly increase other supplementary mechanisms when realizing the control module 206, for deciding operations of the electricity storing device 20. For example, a plurality of keystrokes can be added for indicating different power specifications or charging operations, respectively. As a result, when a user presses a keystroke corresponding to charging operations, the control module 206 switches the rechargeable battery modules RBT_1~RBT_n to be connected in parallel as shown in FIG. 2B; and when a user presses a keystroke corresponding to a power specification of n*V and 1 I, the control module 206 can switch the rechargeable battery modules RBT_1~RBT_n to be connected in series as shown in FIG. 2C.

On the other hand, in the electricity storing device 20, the rechargeable battery modules RBT_1~RBT_n are pluggable in the assembly box 200. In other words, any of the rechargeable battery modules RBT_1~RBT_n can be easily replaced. Therefore, when only one of the rechargeable battery modules RBT_1~RBT_n fails and others still operate normally, a user only needs to replace the failed rechargeable battery module. The replacing operation is only a simple plugging operation, and does not require special equipments or steps, which significantly enhances convenience and avoids waste of resources. For detection of the rechargeable battery modules RBT_1~RBT_n, since the rechargeable battery modules RBT_1~RBT_n can be easily replaced, the user can sequentially plug the rechargeable battery modules RBT_1~RBT_n to measure voltage and current of each rechargeable battery module, to determine whether a rechargeable battery module fails. Besides, detection of the rechargeable battery modules RBT_1~RBT_n can be achieved by cooperating with operations of the control module 206. For example, when performing detections, the high-voltage terminal 202 and the low-voltage terminal 204 can be coupled to a detector with an indicating function, and then the control module 206 outputs proper control commands, such that each of the rechargeable battery modules RBT_1~RBT_n is sequentially coupled to the detector, so as to detect an operating status of each rechargeable battery module, respectively. The detector can be a light-emitting diode (LED) light with specific resistance, or an electric meter with complex measurement functions, and is not limited to these.

Figure 3:
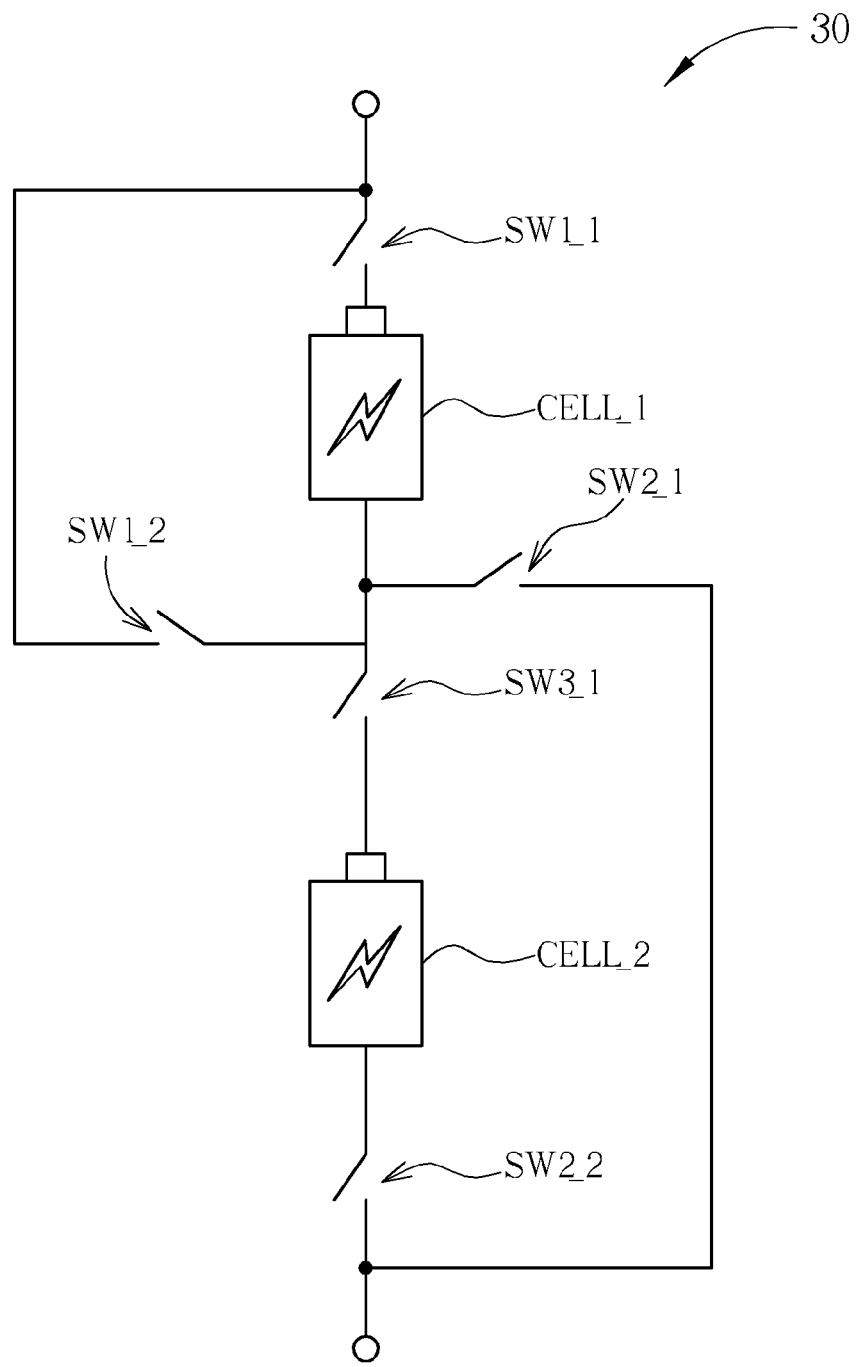
FIG. 3, FIG. 4 and FIG. 5 are schematic diagrams of electricity storing devices according to embodiments of the present invention, respectively.
Figure 4:
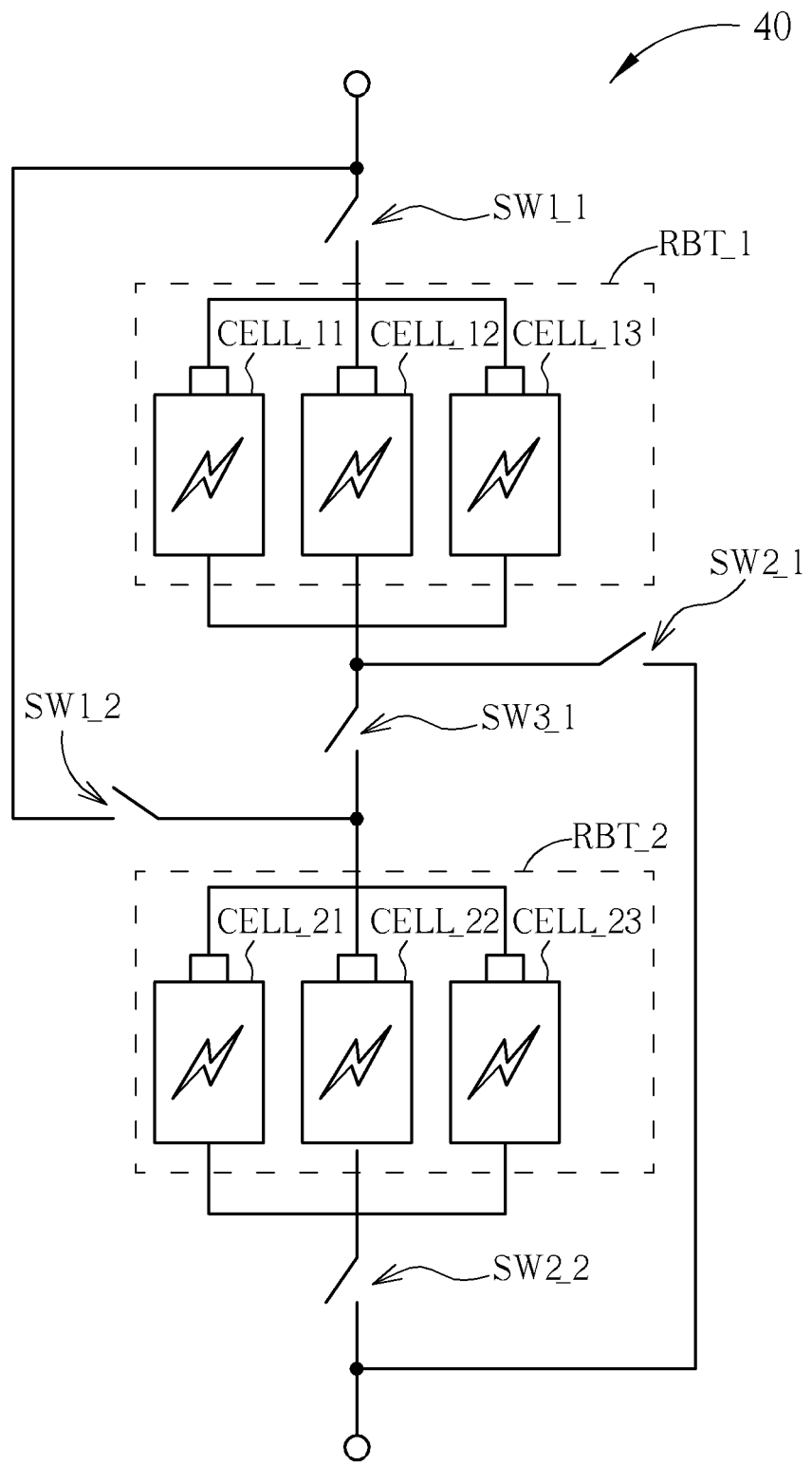
Figure 5:
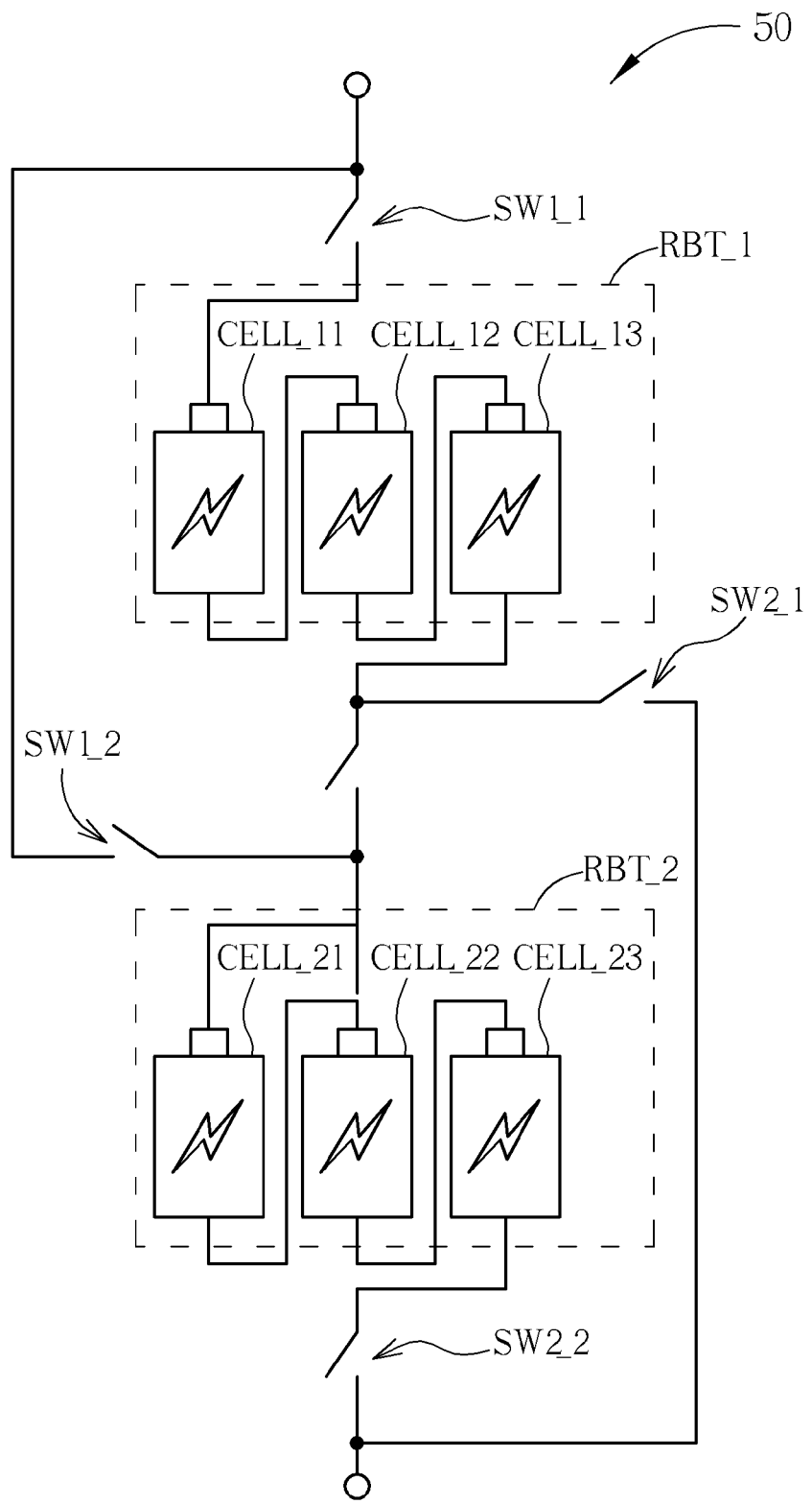

Noticeably, each of the rechargeable battery modules RBT_1~RBT_n relates to a device or a set of multiple devices with charging, discharging functions, In other words, any rechargeable battery module can be assembled by at least one battery cells, and the at least one battery cells can be connected in series or in parallel. For example, please refer to FIG. 3, FIG. 4 and FIG. 5. FIG. 3, FIG. 4 and FIG. 5 are schematic diagrams of electricity storing devices 30, 40, 50 according to embodiments of the present invention, respectively. For simplicity, assembly boxes and control modules of the electricity storing devices 30, 40, 50 are omitted, and can be derived by referring to the electricity storing device 20. Related operations of the electricity storing devices 30, 40, 50 can be referred to the above description related to the electricity storing device 20 as well. As can be seen by comparing the electricity storing devices 30, 40, 50, in the electricity storing device 30, the rechargeable battery modules RBT_1 and RBT_2 are composed by battery units CELL_1 and CELL_2, respectively; in the electricity storing device 40, the rechargeable battery module RBT_1 includes battery units CELL_11, CELL_12, CELL_13 connected in parallel, and the rechargeable battery module RBT_2 includes battery units CELL_21, CELL_22, CELL_23 connected in parallel; and in the electricity storing device 50, the rechargeable battery module RBT_1 includes the battery units CELL_11, CELL_12, CELL_13 connected in series, and the rechargeable battery module RBT_2 includes the battery units CELL_21, CELL_22, CELL_23 connected in series. Therefore, in the present invention, an amount of battery units included in a rechargeable battery module is not limited, and the battery units can be connected in parallel or in series.

Figure 6:
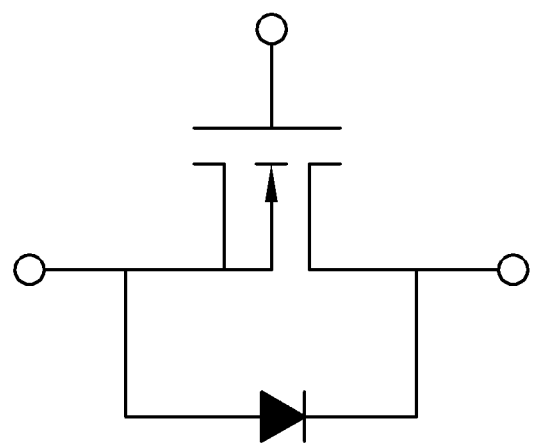
FIG. 6 and FIG. 7 are schematic diagrams of conventional switches.
Figure 7:
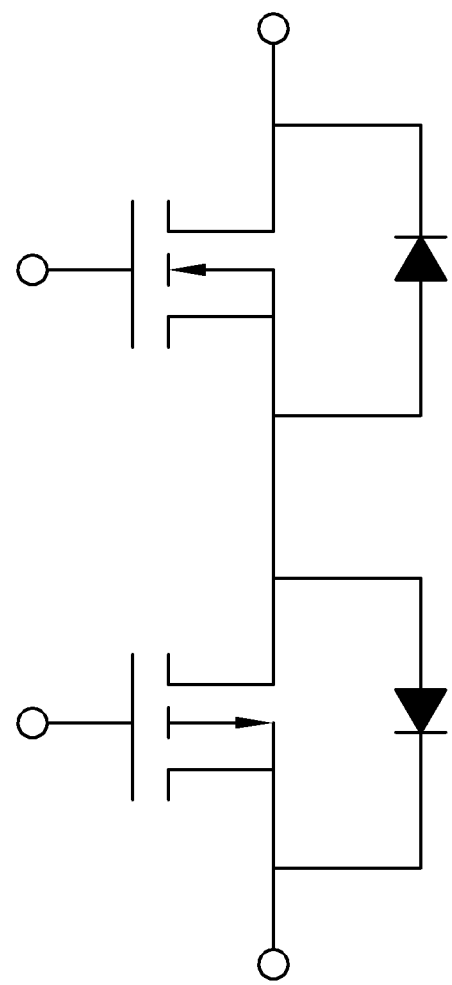

On the other hand, in the above embodiments, the first switch, the second switch, and the third switch are not limited to any switch with a specific type. For example, the first switch and third switch can be a power switch composed by a transistor connecting with a diode as shown in FIG. 6, and the second switch can be a switch composed by transistors connected in series and back-to-back diodes as shown in FIG. 7. However, FIG. 6 and FIG. 7 only illustrate common controllable switches, and should not limit realization of the present invention.

Noticeably, the concept of the present invention is to provide the electricity storing device 20 with excellent operating flexibility, and is not limited to operations of the control module 206. Therefore, those skilled in the art should properly modify or alter operating logic or components of the electricity storing device 20 according to different system requirements. For example, other than replacing the conventional rechargeable battery and utilized in all kinds of electronic device or equipments, the electricity storing device 20 can realize a charger with discharging functions, to prolong operating life of a rechargeable battery. In short, when utilizing the electricity storing device 20 to realize the charger with discharging functions, the rechargeable battery modules RBT_1~RBT_n relate to batteries to be charged. More specifically, the rechargeable battery modules RBT_1~RBT_n can be discharged to the load LD as shown in FIG. 2C first, and then the rechargeable battery modules RBT_1~RBT_n are charged in parallel as shown in FIG. 2B after being discharged. The above two steps of discharging and charging operations can be easily achieved by adjusting operating logic of the control module 206 and adding appropriate switching units, and should be well known by those skilled in the art.

In the conventional rechargeable battery, the battery units are irreversibly packaged in the housing, and are immovable connected. Therefore, when one battery unit fails, the whole rechargeable battery fails as well, and cannot function as expected. Besides, protecting circuits need to be installed in the conventional rechargeable battery, which increases cost and still has safety concerns. In comparison, when a rechargeable battery is realized by the electricity storing device of the present invention, since all of the rechargeable battery modules can be easily replaced, even if one rechargeable battery module fails, the user only needs to replace the rechargeable battery module, where the replacing operation is only a simple plugging operation and does not require special equipments or steps, which significantly enhances convenience and avoids waste of resources. Moreover, when the electricity storing device of the present invention performs charging operations, each rechargeable battery module operates in parallel, which can avoid the risk of one rechargeable battery module draining too much current and thus being burnt. The voltages across each rechargeable battery module are the same when the rechargeable battery modules are charged in parallel, so as to ensure charging efficiencies for each rechargeable battery module at approximate levels. Thus, protecting circuits between the rechargeable battery modules can be omitted, or replaced with protecting circuits of low cost to achieve protecting effect. In addition, the main feature of the electricity storing device of the present invention is flexible operations, which can meet all kinds of different power outputting or storing requirements, and are not limited to rechargeable battery.

To sum up, the present invention provides an electricity storing device with excellent operating flexibility, to meet all kinds of power requirements.

Those skilled in the art will readily observe that numerous modifications and alterations of the device and method may be made while retaining the teachings of the invention.

What is claimed is:

1. An electricity storing device comprising:
a high-voltage terminal;
a low-voltage terminal;
a plurality of rechargeable battery modules, each for storing electrical energy or outputting stored electrical energy;
a plurality of first switches, each coupled between one of the plurality of rechargeable battery modules and the high-voltage terminal, for turning on or turning off electrical connection between the rechargeable battery module and the high-voltage terminal according to a control command;
a plurality of second switches, each coupled between one of the plurality of rechargeable battery modules and the low-voltage terminal, for turning on or turning off electrical connection between the rechargeable battery module and the low-voltage terminal according to the control command;
a plurality of third switches, each coupled between two of the plurality of rechargeable battery modules, for turning on or turning off electrical connection between the two rechargeable battery modules according to the control command; and
a control module, for outputting the control command to control the plurality of first switches, the plurality of second switches and the plurality of third switches.

2. The electricity storing device of claim 1, wherein one of the plurality of rechargeable battery modules comprises a plurality of battery units connected in parallel.

3. The electricity storing device of claim 1, wherein the control module controls the plurality of first switches to turn on electrical connections between the plurality of rechargeable battery modules and the high-voltage terminal, controls the plurality of second switches to turn on electrical connections between the plurality of rechargeable battery modules and the low-voltage terminal, and controls the plurality of third switches to turn off electrical connections between any two of the plurality of rechargeable battery modules via the control command if the high-voltage terminal and the low-voltage terminal are coupled to a power generator.

4. The electricity storing device of claim 1, wherein the control module outputs the control command according to a power specification if the high-voltage terminal and the low-voltage terminal are coupled to a load, to control the plurality of first switches, the plurality of second switches and the plurality of third switches, such that the plurality of rechargeable battery modules output power conforming to the power specification.

5. The electricity storing device of claim 1 further comprising a detector, for detecting the plurality of rechargeable battery modules, wherein the control module controls the plurality of first switches, the plurality of second switches and the plurality of third switches via the control command if the detector is coupled to the high-voltage terminal and the low-voltage terminal, such that the plurality of rechargeable battery modules are coupled to the detector sequentially.

6. The electricity storing device of claim 1 further comprises an assembly box, for assembling the plurality of rechargeable battery modules, the plurality of first switches, the plurality of second switches, the plurality of third switches and the control modules, wherein the plurality of rechargeable battery modules are pluggable in the assembly box.

7. An electronic device, comprising:
an operating circuit, for realizing functions of the electronic device; and
an electricity storing device, for supplying electricity for the operating circuit, comprising:
a high-voltage terminal;
a low-voltage terminal;
a plurality of rechargeable battery modules, each for storing electrical energy or outputting stored electrical energy;
a plurality of first switches, each coupled between one of the plurality of rechargeable battery modules and the high-voltage terminal, for turning on or turning off electrical connection between the rechargeable battery module and the high-voltage terminal according to a control command;
a plurality of second switches, each coupled between one of the plurality of rechargeable battery modules and the low-voltage terminal, for turning on or turning off electrical connection between the rechargeable battery module and the low-voltage terminal according to the control command;
a plurality of third switches, each coupled between two of the plurality of rechargeable battery modules, for turning on or turning off electrical connection between the two rechargeable battery modules according to the control command; and
a control module, for outputting the control command to control the plurality of first switches, the plurality of second switches and the plurality of third switches.

8. The electronic device of claim 7, wherein one of the plurality of rechargeable battery modules comprises a plurality of battery units connected in parallel.

9. The electronic device of claim 7, wherein the control module controls the plurality of first switches to turn on electrical connections between the plurality of rechargeable battery modules and the high-voltage terminal, controls the plurality of second switches to turn on electrical connections between the plurality of rechargeable battery modules and the low-voltage terminal, and controls the plurality of third switches to turn off electrical connections between any two of the plurality of rechargeable battery modules via the control command if the high-voltage terminal and the low-voltage terminal are coupled to a power generator.

10. The electronic device of claim 7, wherein the control module outputs the control command according to a power specification if the high-voltage terminal and the low-voltage terminal are coupled to a load, to control the plurality of first switches, the plurality of second switches and the plurality of third switches, such that the plurality of rechargeable battery modules outputs power conforming to the power specification.

11. The electronic device of claim 7, wherein the electricity storing device further comprises a detector, for detecting the plurality of rechargeable battery modules, wherein the control module controls the plurality of first switches, the plurality of second switches and the plurality of third switches via the control command if the detector is coupled to the high-voltage terminal and the low-voltage terminal, such that the plurality of rechargeable battery modules are coupled to the detector sequentially.

12. The electronic device of claim 7, wherein the electricity storing device further comprises an assembly box, for assembling the plurality of rechargeable battery modules, the plurality of first switches, the plurality of second switches, the plurality of third switches and the control modules, wherein the plurality of rechargeable battery modules are pluggable in the assembly box.

* * * * *